United States Patent
Pendray et al.

(10) Patent No.: US 6,678,119 B1
(45) Date of Patent: Jan. 13, 2004

(54) DISC HEAD SLIDER HAVING RAILS WITH ENCLOSED DEPRESSIONS

(75) Inventors: John R Pendray, Edina, MN (US); Yu-Li Chang, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 231 days.

(21) Appl. No.: 09/832,050

(22) Filed: Apr. 10, 2001

Related U.S. Application Data
(60) Provisional application No. 60/196,664, filed on Apr. 12, 2000.

(51) Int. Cl.[7] .............................................. G11B 21/21
(52) U.S. Cl. ............................... 360/236.6; 360/235.8; 360/236.3; 360/237
(58) Field of Search ........................... 360/235.4–237.1

(56) References Cited

U.S. PATENT DOCUMENTS

| | | | |
|---|---|---|---|
| 4,212,044 A | 7/1980 | Plotto | 360/103 |
| 4,218,715 A | 8/1980 | Garnier | 360/103 |
| 4,553,184 A | 11/1985 | Ogishima | 360/103 |
| 4,646,180 A | 2/1987 | Ohtsubo | 360/103 |
| 4,757,402 A | 7/1988 | Mo | 360/103 |
| 4,814,906 A | 3/1989 | Suzuki et al. | 360/75 |
| 4,984,114 A | 1/1991 | Takeuchi et al. | 360/103 |
| 5,086,360 A | 2/1992 | Smith et al. | 360/103 |
| 5,128,822 A | 7/1992 | Chapin et al. | 360/103 |
| 5,200,868 A | 4/1993 | Chapin et al. | 360/103 |
| 5,218,494 A | 6/1993 | Chapin et al. | 360/103 |
| 5,267,109 A | 11/1993 | Chapin et al. | 360/103 |
| 5,317,465 A | 5/1994 | Chapin et al. | 360/103 |
| 5,343,343 A | 8/1994 | Chapin | 360/103 |
| 5,359,480 A | 10/1994 | Nepela et al. | 360/103 |
| 5,404,256 A | 4/1995 | White | 360/103 |
| 5,490,026 A | 2/1996 | Dorius et al. | 360/103 |
| 5,508,862 A | 4/1996 | Lazzari et al. | 360/103 |
| 5,513,056 A | 4/1996 | Kawasaki et al. | 360/103 |
| 5,550,693 A | 8/1996 | Hendriks et al. | 360/103 |
| 5,636,085 A | 6/1997 | Jones et al. | 360/103 |
| 5,737,151 A | 4/1998 | Bolasna et al. | 360/103 |
| 5,761,004 A | 6/1998 | Peck | 360/103 |
| 5,781,377 A | 7/1998 | Koka et al. | 360/103 |
| 5,796,551 A | 8/1998 | Samuelson | 360/103 |
| 5,940,249 A * | 8/1999 | Hendriks | 360/235.6 |
| 5,953,181 A | 9/1999 | Utsunomiya | 360/103 |
| 5,963,396 A | 10/1999 | Burga et al. | 360/103 |
| 5,973,881 A | 10/1999 | Ajiki | 360/103 |
| 6,137,656 A * | 10/2000 | Levi et al. | 360/235.4 |
| 6,144,529 A * | 11/2000 | Wada et al. | 360/236.1 |
| 6,188,547 B1 * | 2/2001 | Gui et al. | 360/236.5 |
| 6,490,135 B1 * | 12/2002 | Sannino et al. | 360/235.8 |
| 6,515,831 B1 * | 2/2003 | Sannino et al. | 360/235.6 |

FOREIGN PATENT DOCUMENTS

| | | |
|---|---|---|
| JP | 59-98347 | 6/1984 |
| JP | 60/242548 | 2/1985 |
| JP | 1-211383 | 8/1989 |
| JP | 1-245480 | 9/1989 |
| JP | 1-319188 | 12/1989 |
| JP | 3-132981 | 6/1991 |

* cited by examiner

*Primary Examiner*—Jefferson Evans
(74) *Attorney, Agent, or Firm*—Westman, Champlin & Kelly (57) ABSTRACT

A disc head slider includes a longitudinal axis, a recessed region, and first and second elongated rails extending generally parallel to the longitudinal axis and being disposed about the recessed region. Each rail forms a respective bearing surface. First and second elongated depressions extend along the first and second rails, respectively, and each has a depression floor which is recessed relative to the respective bearing surface. First and second convergent channels are recessed within the first and second rails, respectively, relative to the respective bearing surfaces, and include a leading channel end open to fluid flow from the first and second depressions, respectively, channel side walls and a trailing channel end closed to the fluid flow and positioned forward of a portion of the respective bearing surface.

20 Claims, 6 Drawing Sheets

DISC HEAD SLIDER HAVING RAILS WITH ENCLOSED DEPRESSIONS

CROSS-REFERENCE TO RELATED APPLICATION

This application claims the benefit of U.S. Provisional Application Serial No. 60/196,664, entitled "ENCLOSED DEPRESSION ON AIR BEARING SLIDER," filed Apr. 12, 2000.

Cross reference is also made to U.S. Ser. No. 09/548,148, entitled "DISC HEAD SLIDER HAVING RECESSED, TRENCHED RAILS FOR ENHANCED DAMPING," filed Apr. 13, 2000.

FIELD OF THE INVENTION

The present invention relates to disc drive data storage systems and, more particularly, to a disc head slider for carrying a read/write transducer within a disc drive.

BACKGROUND OF THE INVENTION

Disc drives are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider has a bearing surface which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a subambient pressure cavity. The leading taper is typically lapped or etched onto the end of the slider that is opposite to the recording head. The leading taper pressurizes the air as the air is dragged under the slider by the disc surface. The cavity dam provides an expansion path for the air to de-pressurize as it is dragged into the sub-ambient pressure cavity by the disc velocity. The expanded air in the cavity provides a self-loading force which forces the slider toward the disc surface. The counteraction between positive pressure developed along the side rails, the preload force provided by the suspension and the self-loading force provides the air bearing with a high vertical stiffness.

The physical separation between the slider and the disc surface at the recording head is an important parameter to disc drive performance. It is desired to minimize variation in the head clearance or "flying height" as the data storage device operated at different altitudes above sea level. It is well known that conventional sliders demonstrate flying height sensitivity to changes in ambient pressure. Specifically, flying height is inversely proportional to operating altitude. Flying height sensitivity to changes in ambient pressure poses severe problems for sliders that are designed to operate at very low flying heights (less than or equal to 1 microinch), since a 20% drop in ambient pressure greatly increases the probability of contact between the slider and the disc surface.

This behavior forces disc drive designers to meet minimum flying height requirements at the highest specified altitude, which is typically 10,000 feet above sea level. As a result, the sliders are designed to fly with an undesirably large head-media spacing at altitudes where the disc drive is most frequently used, i.e., near sea level. Such a design compromise reduces the maximum useable linear density of the storage media and thus the storage capacity of the disc drive.

A slider is therefore desired which has a reduced flying height sensitivity to changes in altitude while being relatively insensitive to manufacturing tolerances. The present invention addresses these and other problems, and offers other advantages over the prior art.

SUMMARY OF THE INVENTION

One aspect of the present invention relates to a disc head slider, which includes a longitudinal axis, a recessed region, and first and second elongated rails extending generally parallel to the longitudinal axis and being disposed about the recessed region. Each rail forms a respective bearing surface. First and second elongated depressions extend along the first and second tails, respectively, and each have a depression floor which is recessed relative to the respective bearing surface. First and second convergent channels are recessed within the first and second rails, respectively, relative to the respective bearing surfaces, and include a leading channel end open to fluid flow from the first and second depressions, respectively, channel side walls and a trailing channel end closed to the fluid flow and positioned forward of a portion of the respective bearing surface.

Another aspect of the present invention relates to a disc head slider, which includes a slider body having a leading slider edge, a trailing slider edge and a longitudinal axis extending from the leading slider edge to the trailing slider edge. A recessed area is formed on the slider body and is open to the trailing slider edge. At least one elongated rail extends generally parallel to the longitudinal axis, along the recessed area and forms a bearing surface. A first elongated depression extends along the rail and has a depression floor which is recessed relative to the bearing surface by a first depth. A convergent channel is recessed within the bearing surface and has a leading channel end open to fluid flow from the first elongated depression, channel side walls, a trailing channel end closed to the fluid flow and forward of a portion of the bearing surface, and a channel floor which is recessed relative to the bearing surface by a second depth that is less than the first depth.

Yet another aspect of the present invention relates to a disc drive, which includes a disc and a slider bearing. The disc is rotatable about a central axis and has a recording surface. The slider bearing supports a transducer over the recording surface while directing air flow along rails of the slider bearing means and over a convergent channel feature formed in the rails.

These and various other features as well as advantages which characterize the present invention will be apparent upon reading the following detailed description and review of the associated drawings.

DETAILED DESCRIPTION OF ILLUSTRATIVE EMBODIMENTS

Figure 1:
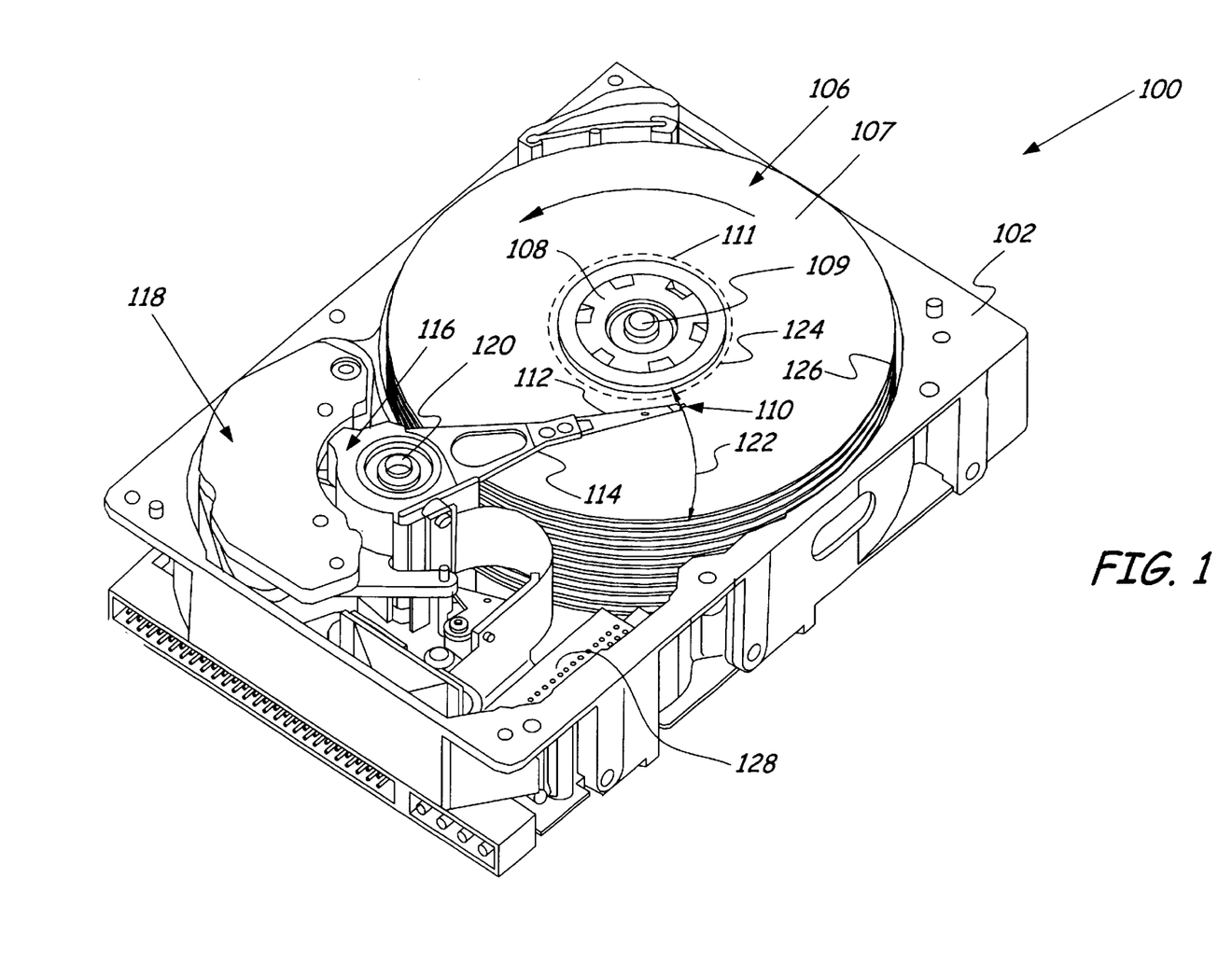
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCN), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their bearing surfaces in a direction approximately parallel to the tangential velocity of the discs. As the air passes beneath the bearing surfaces, air compression along the air flow path causes the air pressure between the discs and the bearing surfaces to increase, which creates a hydrodynamic lifting force that counteracts the load force provided by suspensions 112 and causes the sliders 110 to lift and fly above or in close proximity to the disc surfaces.

As discussed in more detail below, slider 110 has a hydrodynamic (e.g. air) bearing that has a reduced fly height sensitivity to changes in ambient pressure at altitudes between sea level and 10,000 feet above sea level. This allows the target fly height to be set more efficiently for flying conditions at sea level, and also reduces the possibility of head crashes at high operating altitudes.

Figure 2:
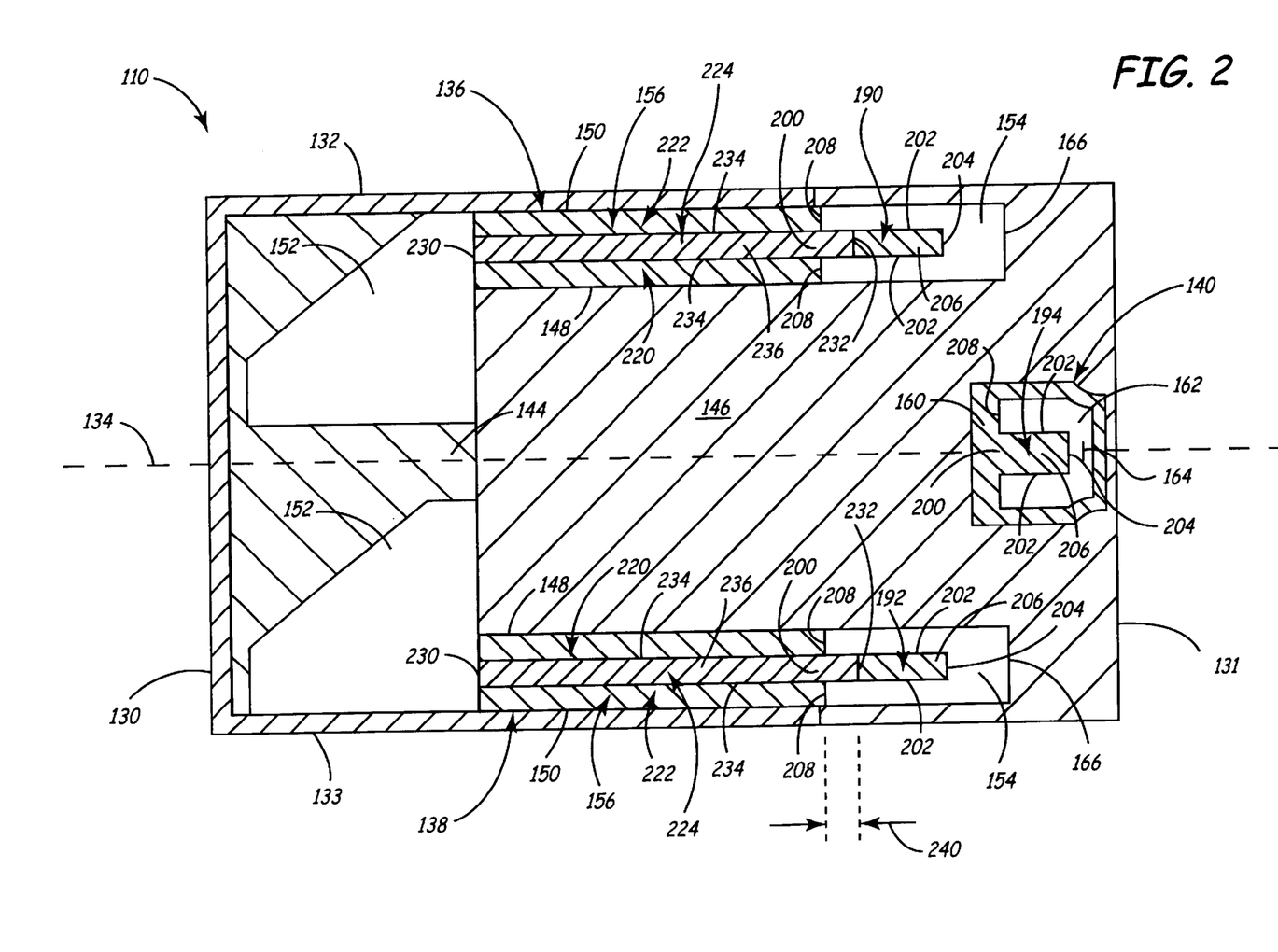
FIG. 2 is a bottom plan view of a slider shown in FIG. 1, as viewed from the surface of a disc, according to one embodiment of the present invention.

FIG. 2 is a bottom plan view of slider 110 as viewed from the disc surface, according to one embodiment of the present invention. Changes in surface shading in FIG. 2 indicate changes in surface depth relative to a bearing surface level. Areas on slider 110 having the same surface shading have similar depths.

Slider 110 has a leading slider edge 130, a trailing slider edge 131, slider side edges 132 and 133 and a lateral center line or longitudinal axis 134. In the embodiment shown in FIG. 2, slider 110 has a length along side edges 132 and 133 of 1.25 millimeters (mm) and a width along leading and trailing edges 130 and 131 of 1.01 mm. This slider size is often referred to as a "picoslider" size. However, other larger and smaller slider sizes can also be used with the present invention.

Slider 110 further includes a pair of elongated side rails 136 and 138, a center rail or pad 140, a cavity dam 144 and a recessed area 146, which is known as a subambient pressure cavity. Side rails 136 and 138 are positioned along side edges 132 and 133, respectively, and are disposed about cavity 146. Rails 136 and 138 extend generally parallel to lateral center line 134, from leading slider edge 130 toward trailing slider edge 131, and terminate prior to trailing edge 131. The term "generally parallel" as used in the specification and claims includes rails that are parallel to center line 134 and rails that are somewhat skewed relative to center line 134. Each rail 136 and 138 has an inside rail edge 148, an outside rail edge 150, a leading bearing surface 152, a trailing bearing surface 154 and a recessed waist section 156.

Bearing surfaces 152 and 154 can be substantially coplanar with one another in one embodiment of the present invention. These surfaces are typically defined during a fabrication of slider 110 by a lapping process. Alternatively, one or more of the bearing surfaces or portions of the bearing surfaces on slider 110 can be out-of-plane with the other bearing surfaces. These surfaces can be recessed from the lapping plane or can be raised from the lapping plane by adding material to the rails.

Cavity dam 144 extends along leading slider edge 130, between side rails 136 and 138 for defining subambient pressure cavity 146, which trails cavity dam 144 relative to a direction of air flow from leading slider edge 130 toward trailing slider edge 131. In one embodiment, cavity dam 144 is generally parallel to and recessed from bearing surfaces 152 and 154 by a step depth of 0.1 micrometers (um) to 0.3 um, for example. Other depths can also be used. Alternatively, cavity dam 144 can be formed as a leading taper or with a tapered leading edge. Subambient pressure cavity 146 is recessed from leading and trailing bearing surfaces 152 and 154 by a "cavity depth" of 1 um to 3 um, for example.

Center rail 140 is positioned along trailing slider edge 131 and is centered along lateral center line 134. In alternative embodiments, center rail 140 can be skewed or offset with respect to line 134. Center rail 140 has a leading step surface 160 and a beating surface 162. Leading step surface 160 is generally parallel to and recessed from bearing surface 162 by a step depth of 0.1 um to 0.3 um, for example, for providing pressurization of bearing surface 162 from air flow venting from cavity 146.

Center rail 140 supports a read/write transducer 164 along trailing slider edge 131. In alternative embodiments, transducer 164 can be positioned at other locations on slider 110. However, when placed at or near trailing slider edge 131, transducer 164 is located near the closest point on slider 110 to the surface of disc 107 (shown in FIG. 1) when slider 110 flies with a positive pitch angle. With a positive pitch angle, trailing slider edge 131 is closer to the surface of disc 107 than leading slider edge 130.

Rails 136 and 138 terminate prior to trailing slider edge 131 to allow slider 110 to roll about lateral center line 134 without risking contact between trailing rail edges 166 and the disc surface. Therefore, the trailing edge of center pad 140 remains the closest location on slider 110 to the disc surface during flight at relatively large roll angles, thereby improving read and write performance. However, truncating side rails 136 and 138 reduces the amount of positive pressure developed along the rails near trailing slider edge 131, which reduces pitch and roll stiffness.

In order to limit the reduction in pitch and roll stiffness and to limit fly height sensitivity to changes in altitude, slider 110 includes convergent channel features 190, 192 and 194, which are recessed within trailing bearing surfaces 154 of side rails 136 and 138 and within center rail bearing surface 162. These channels can also be referred to as trenches. Channels 190, 192 and 194 each have a leading channel end 200, channel side walls 202, trailing channel end 204 and a channel floor 206. Channels 190, 192 and 194 also have a side wall 208 to either side of the leading channel ends 200. Channels 190, 192 and 194 are formed through photolithography processes, such as ion milling, chemical etching or reactive ion etching (RIE). With these processes, the depth and location of the channels can be accurately controlled.

In one embodiment, channel floors 206 of channels 190 and 192 are coplanar with recessed waist sections 156 of rails 136 and 138, while channel floor 206 of channel 194 is coplanar and contiguous with leading step surface 160 of center rail 140. Channels 190, 192 and 194 thus have depths, as measured from bearing surfaces 152, 154 and 162 of 0.1 um to 0.3 um, for example.

On side rails 136 and 138, leading channel ends 200 are open to fluid flow from recessed waist sections 156. Trailing channel ends 204 are closed to the fluid flow. The side walls 208 to either side of leading channel ends 200 present themselves as a substantial pressure rise to the local fluid flow. Since the opening to each channel, at leading channel ends 200, does not have the same pressure rise, it is seen as a preferential path for the fluid flow to travel. Once the fluid flow enters channels 190 and 192, the flow is essentially bounded by channel side walls 202 and trailing channel end 204 and is forced to rise over trailing channel end 204, forming a "convergent" channel for the flow. This creates localized positive pressure gradients at discrete regions on trailing bearing surfaces 154, rearward of trailing channel ends 204. Again, the trailing bearing surfaces can be within the lapping plane of slider 110, recessed from the lapping plane or raised from the lapping plane. The localized positive pressure gradients developed on trailing bearing surfaces 154 increase the roll stiffness of slider 110 and yield high peak pressures that dampen roll mode vibrations at the slider's natural resonant frequencies.

Similarly, the leading end 200 of channel 194 on center rail 140 is open to fluid flow from cavity 146, and trailing channel end 204 is closed to the fluid flow. A portion of the fluid flow from cavity 146 is directed into channel 194 and is forced to exit the channel over trailing channel end 204. Again, this creates a localized positive pressure gradient region on bearing surface 162, rearward of trailing channel end 204. Bearing surface 162 can be coplanar with or out-of plane from bearing surfaces 154.

The term "convergent channel" includes channels having parallel side walls, converging side walls and diverging side walls, as long as flow through the channel is essentially bounded by the channel side walls and the trailing channel end. Channels 190, 192 and 194 can be symmetrical about lateral center line 134, as shown in FIG. 2, or can be asymmetrical to provide preferential pressurization as certain slider skew angles.

The size and intensity of the localized positive pressure gradient regions depend on the channel length-to-width ratio, the absolute sizes of the channels, the depth and shape of the channel floors, and the height of the column of air between the channel floor and the disc surface. In one embodiment, the ratio of the channel lengths to the channels widths range from 0.5 to 5.0, but may vary outside that range depending on the design purposes of the channel feature.

Waist sections 156 of side rails 136 and 138 are adapted to further increase the positive pressure gradients developed by convergent channels 190 and 192. Waist sections 156 extend from leading bearing surfaces 152 to trailing bearing surfaces 154. Each waist section 156 includes a pair of lateral air flow barrier surfaces 220 and 222 and an elongated depression 224. Barrier surface 220 extends along inside rail edge 148, and barrier surface 222 extends along outside rail edge 150. In one embodiment, barrier surfaces 220 and 222 are generally parallel to and recessed from bearing surfaces 152 and 154 by a step depth of 0.1 to 0.3 um, for example. Other depths can also be used in alternative embodiments. Recessing waist sections 156 assists in pressurizing rails 136 and 138 when slider 110 flies at skew with respect to air flow and reduces the contact area of slider 110 when slider 110 at rest on the surface of disc 107 (shown in FIG. 1). Barrier surfaces 220 and 222 develop substantially ambient pressure during flight.

Depressions 224 have a leading end 230, a trailing end 232, side walls 234 and a depression floor 236. In the embodiment shown in FIG. 2, depressions 224 are etched during the formation of the recessed step surfaces 144, 220, 222 and 160 of slider 110 and during the formation of cavity 146. Thus, depressions 224 have a depth measured from bearing surfaces 152 and 154 that is equal to the "step depth" of 0.1 to 0.3 um plus a "cavity depth" of 1 to 3 um, for example.

Depressions 224 have perimeters that are completely surrounded by less recessed regions of rails 136 and 138. Leading ends 230 are bounded by leading bearing surfaces 152, trailing ends 232 are bounded by channel floors 206, and side walls 234 are bounded partly by barrier surfaces 220 and 222 and partly by trailing bearing surface 154, along channel side walls 202. Depressions 224 intersect leading channel ends 200 and extend into channels 190 and 192 by a distance 240.

During operation, as air flows over leading bearing surfaces 152 and into depressions 224, barrier surfaces 220 and 222 act as barriers to fluid flow from depressions 224 into cavity 146 and over slider side edges 132 and 133. This reduces the amount of air that bleeds off of rails 136 and 138. Therefore, there is more air flow into the entrances of channels 190 and 192. This results in an even higher pressure being generated on trailing bearing surfaces 154, as the increased air flow is forced to exit channels 190 and 192 over trailing channel ends 204. In certain embodiments, cavity floors 206 can also become pressurized, which can add to the pressure developed on trailing bearing surfaces 150.

In addition, since less air bleeds off of rails 136 and 138 and into cavity 146, the pressure within cavity 146 becomes even more subambient. Also, depressions 224 create small areas of additional subambient pressure near leading ends 230 as the air expands into depressions 224 from leading bearing surfaces 152. As a result, slider 110 increases both positive and negative pressure generation. This increases the vertical stiffness of slider 110, which decreases the flying height sensitivity of slider 110 to changes in pitch torque and preload force. This also moves the center of negative pressure rearward along the slider length, which decreases the flying height sensitivity of slider 110 to changes in altitude.

The altitude sensitivity of slider 110 was compared to the altitude sensitivity of a slider having a bearing surface with a similar geometry, but with no depressions 224. The comparison was performed using computer simulations to model the pole tip flying height of each slider at altitudes between sea level and 10,000 feet above sea level. The slider having no depressions 224 had a 21.5% change in the pole tip flying height as the altitude changed from sea level to 10,000 feet above sea level.

In contrast, slider 110 had only a 13.4% change in the pole tip flying height as the altitude varied from sea level to 10,000 above sea level. In addition, it was observed that the addition of depressions 224 to the geometry of slider 110 did not cause large changes in the overall sensitivity of the air bearing to manufacturing tolerances.

Depressions 224 can have various configurations in alternative embodiments. For example, the side walls 234 of depressions 224 can be parallel to one another as shown in FIG. 2 or can converge or diverge relative to one another. Side walls 234 can be curvilinear or rectilinear. Also, depression floors 236 can be parallel to bearing surfaces 152 and 154, can be vertically contoured along lateral center line 134 so as to become more shallow or, alternatively, more deep toward trailing end 232, and can be vertically contoured in a direction transverse to center line 134. Likewise, channel floors 206 of convergent channels 190, 192 and 194 can have various vertical contours. In addition, the portions of depressions 224 that extend into channels 190 and 192 can be narrower than the channels such that channel floors 206 extend all the way forward, along opposing sides of the depressions, to leading channel ends 200.

Figure 3:
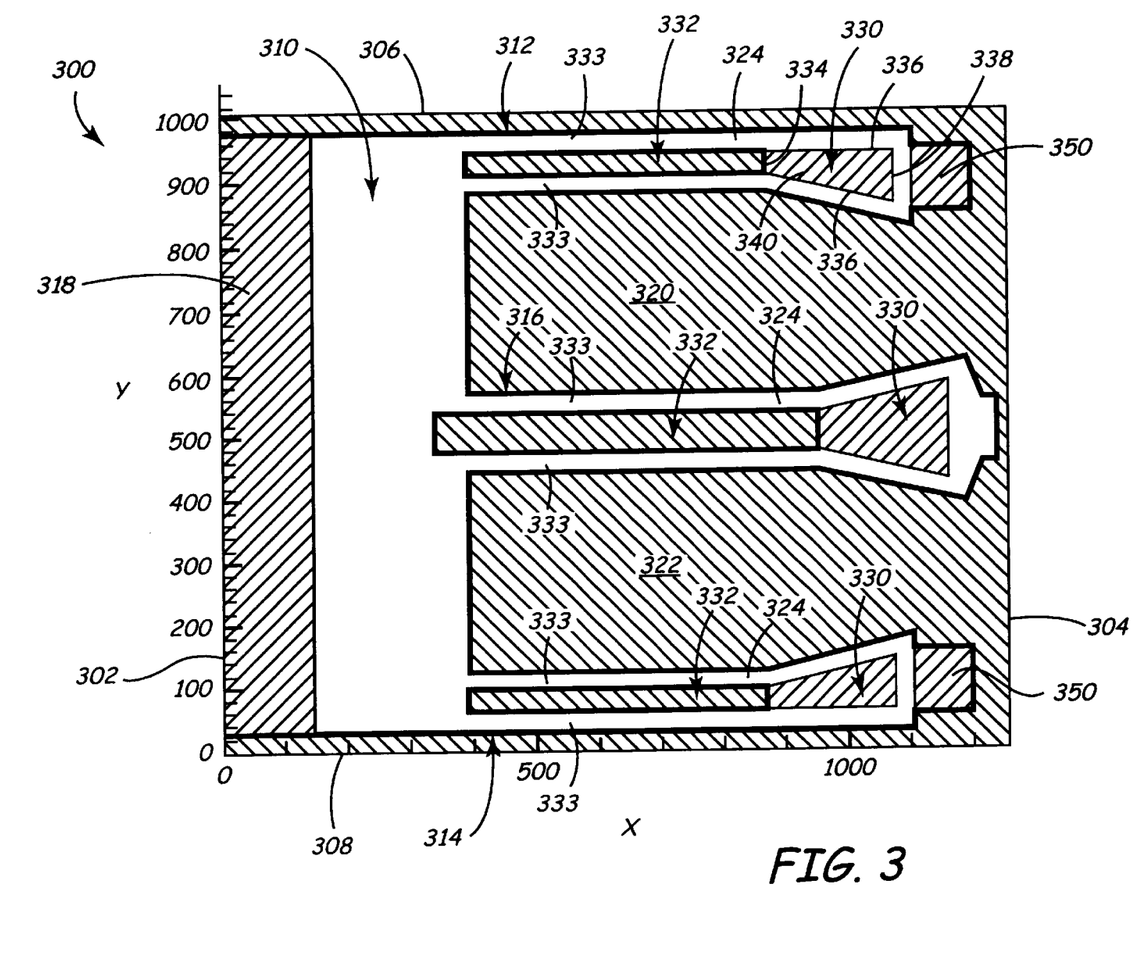
FIG. 3 is a bottom plan view of a slider according to an alternative embodiment of the present invention.

FIG. 3 is a top plan view of a slider 300 according to an alternative embodiment of the present invention. Slider 300 has a leading edge 302, a trailing edge 304 and side edges 306 and 308. Slider 300 further includes a cavity dam 310, side rails 312 and 314 and a center rail 316. In this embodiment, center rail 316 extends from trailing slider edge 302 all the way to cavity dam 310. A leading step surface 318 extends along leading edge 302 for pressurizing cavity dam 310. Leading step surface 318 is recessed from cavity dam 310 by a step depth of 0.1 to 0.3 um, for example. Other depths can also be used. Rails 312, 314, and 316 and cavity dam 310 define subambient pressure cavities 320 and 322, which are recessed from bearing surfaces 324 formed by rails 312, 314 and 316 and cavity dam 310 by a cavity depth of 1 um to 3 um, for example.

Side rails 312 and 314 extend from cavity dam 310 toward trailing slider edge 314 and terminate prior to the trailing edge. Each rail 312, 314 and 316 includes a convergent channel feature 330 and an elongated depression 332, which is bounded by a pair of barrier surfaces 333. Convergent channel features 330 include leading channel ends 334, channel side walls 336, channel ends 338 and channel floors 340. In this embodiment, channel side walls 336 diverge from one another as the side walls extend from leading channel ends 334 toward trailing channel ends 338. However, channel ends 338 remain closed to fluid flow, thereby creating a "convergent channel" feature. Channel floors 340 are recessed from bearing surfaces 324 by the step depth of 0.1 to 0.3 um, for example.

Depressions 332 are recessed within bearing surfaces 324 and extend from cavity dam 310 to the leading ends 334 of convergent channel features 330. In this embodiment, depressions 332 are formed during the formation of cavities 320 and 322 and are therefore recessed from bearing surfaces 324 by the cavity depth of 1 um to 3 um, for example.

Depressions 332 are completely enclosed by bearing surfaces 324, except at the leading ends 334 of channels 330, where the depressions are bounded by channel floors 340. In any case, each depression 332 is completely surrounded by a surface feature of rails 312, 314 and 316 that has a depth that is less than the depth of the depression. Again, the barrier surfaces 333 extending adjacent to depressions 332 serve as efficient barriers to fluid flow from depressions 332 to cavities 320 and 322. This maintains a greater amount of air flow into convergent channel features 330 and reduces the amount of air entering cavities 320 and 322.

Side rails 312 and 314 further include recessed trailing ends 350, which are recessed from bearing surfaces 342 by the step depth of 0.1 um to 0.3 um, for example. Other depths can also be used. The depth and areas of recessed step surfaces 350 can be varied in alternative embodiments to generate ambient, subambient or positive pressure during operation. Recessed trailing ends 350 extend the effective lengths of subambient pressure cavities 320 and 322 while not interfering with the close point flying height of slider 300 as slider 300 rolls about its central axis.

Although the embodiment shown in FIG. 3 has only two milled levels, any number of milled levels can be used in alternative embodiments, including vertically tapered features and three dimensional recessed regions.

Figure 4:
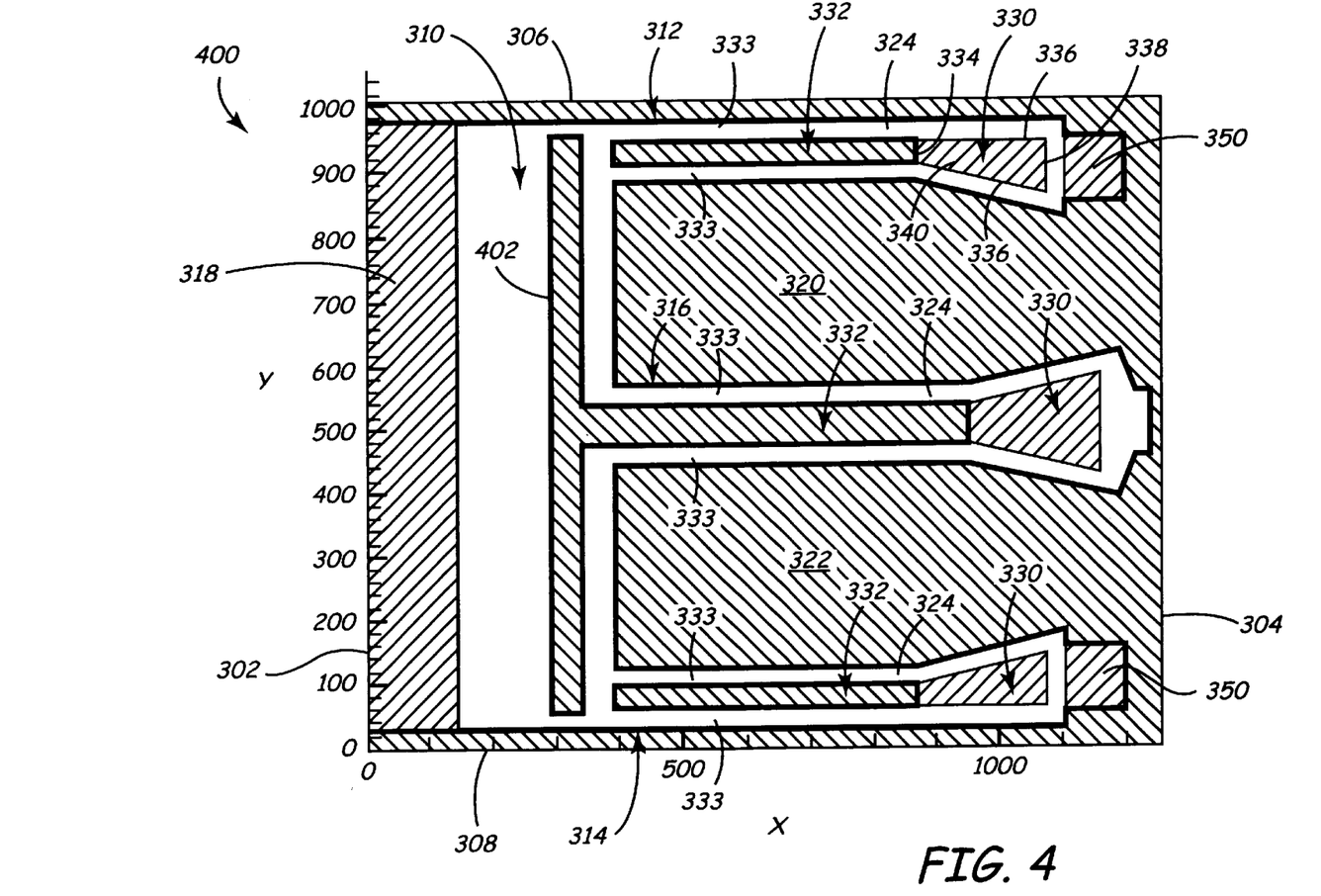
FIG. 4 is a bottom plan view of a slider according to an alternative embodiment of the present invention.

FIG. 4 is a top plan view of a slider 400 according to another alternative embodiment of the present invention. The same reference numerals are used in FIG. 4 as were used in FIG. 3 for the same or similar elements. Slider 400 similar to slider 300, but further includes a laterally extending channel 402, which is recessed within cavity dam 310. Channel 402 has a depth measured from the bearing surfaces of slider 400 of about 1 to 3 um, for example. Channel 402 is connected with depression 332 within center rail 316. Channel 402 provides additional air flow into depression 332 of channel 316 to further increase the positive pressure generated near the trailing end of center rail 316 and to further limit the air available in cavities 320 and 322. In alternative embodiments, channel 402 can be connected to depressions 332 within side rails 312 and 314 in addition to or in replace of being connected to depression 332 of center rail 316. Also, channel 402 can have a variety of shapes and depths relative to the bearing surfaces of slider 400. Channel 402 can be used in any of the embodiments of the present invention.

Figure 5:
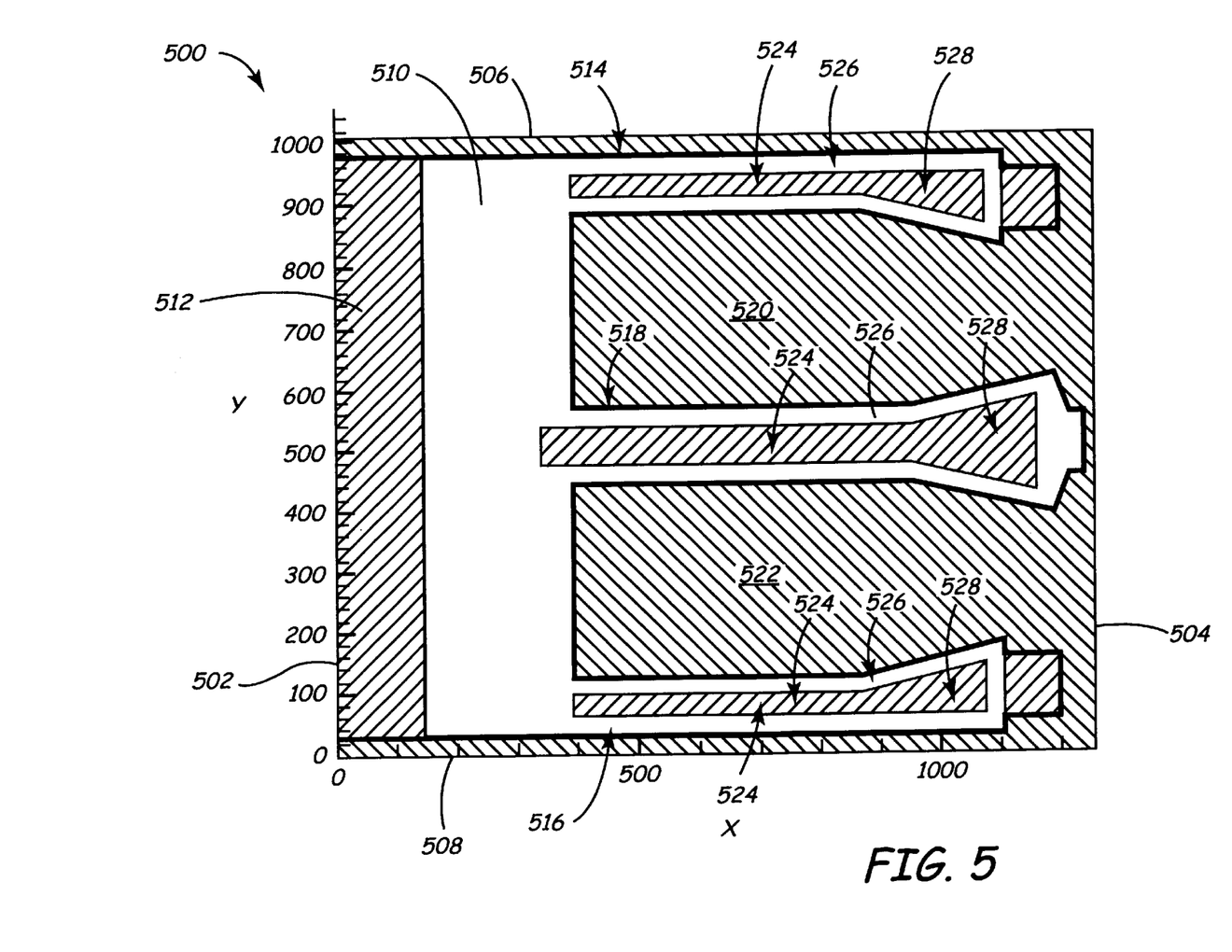
FIG. 5 is a bottom plan view of a slider according to an alternative embodiment of the present invention.

FIG. 5 is a top plan view of a slider 500 according to another alternative embodiment of the present invention. Slider 500 has a leading slider edge 502, a trailing slider edge 504 and side edges 506 and 508. A cavity dam 510 extends generally along leading slider edge 502 and has a leading recessed step surface 512. Side rails 514 and 516 extend rearward from cavity dam 510 toward trailing slider edge 504 to define two subambient pressure cavities 520 and 522. Each of the side rails 514 and 516 and center rail 518 includes a depression 524, which is completely enclosed by a bearing surface 526 formed by the rails. In the embodiment shown in FIG. 5, depressions 524 are coplanar and contiguous with the floors of the convergent channels 528 formed in the trailing ends of the rails.

Figure 6:
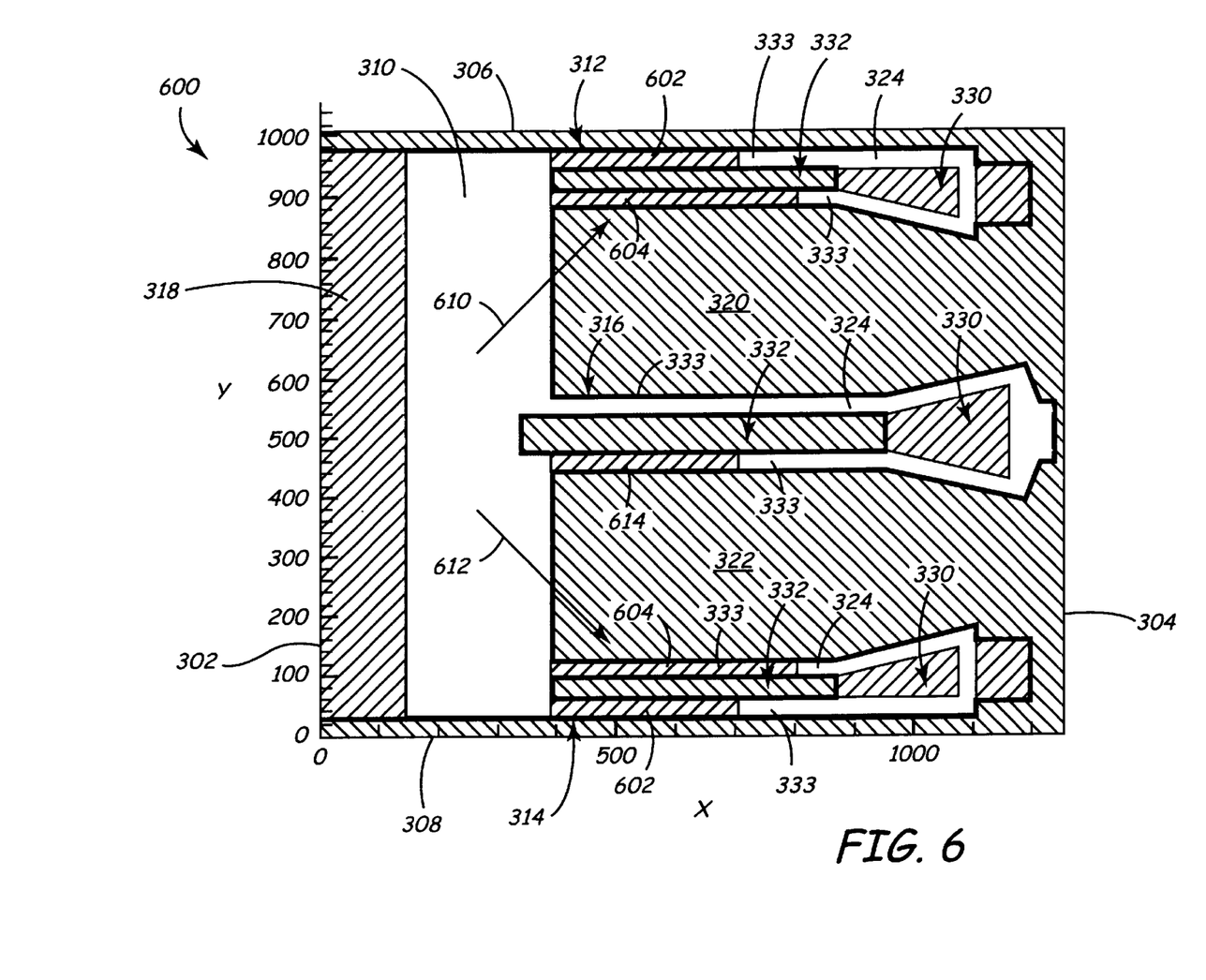
FIG. 6 is a bottom plan view of a slider according to yet another alternative embodiment of the present invention.

FIG. 6 is a top plan view of a slider 600 according to yet another alternative embodiment of the present invention. Slider 600 is similar to slider 300 shown in FIG. 3, but further includes asymmetrically recessed barrier surfaces formed in the waist sections of the rails. Again, the same reference numerals are used in FIG. 6 as were used in FIG. 3 for the same or similar elements. Barrier surfaces 333 in rails 312 and 314 have recessed, step surfaces 602 and 604, which are recessed from bearing surfaces 324 by the step depth, for example. Step surfaces 602 and 604 allow more efficient pressurization of side rail 312 and 314 when slider 600 is oriented at various skew angles relative to the tangential velocity of the disc.

One of the recessed step surfaces 602 and 604 is longer than the other of the step surfaces to provide preferential pressurization at certain skew angles. For example, step surface 604 is longer than step surface 602 to allow more efficient pressurization of side rail 312 when air flow enters the rail from a direction 610 and to allow more efficient pressurization of side rail 314 when air flow enters the rail from a direction 612.

On center rail 316, the barrier surface 333 that is adjacent cavity 322 has a recessed step surface 614, while the barrier surface 333 that is adjacent cavity 320 remains at the height of bearing surface 324 for its entire length. This allows for preferential pressurization from air flow entering center rail 316 from the direction of subambient pressure cavity 322. Numerous other alternative embodiments are also possible. For example, the recessed step surfaces along the "outside" barrier surfaces can be longer than the recessed step surfaces on the "inside" barrier surfaces.

In summary, one aspect of the present invention relates to a disc head slider (such as 110, 300, 400, 500, 600), which includes a longitudinal axis (such as 134), a recessed region (such as 146, 320, 322, 520, 522), and first and second elongated rails (such as 136, 138, 312, 314, 316, 514, 516, 518) extending generally parallel to the longitudinal axis (134) and being disposed about the recessed region (146, 320, 322, 520, 522). Each rail forms a respective bearing surface (such as 152, 154, 324). First and second elongated depressions (such as 224, 332, 524) extend along the first and second rails (136, 138, 312, 314, 316, 514, 516, 518), respectively, and each have a depression floor (such as 236) which is recessed relative to the respective bearing surface (152, 154, 324). First and second convergent channels (such as 190, 192, 330, 528) are recessed within the first and second rails (136, 138, 312, 314, 316, 514, 516, 518), respectively, relative to the respective bearing surfaces, and include a leading channel end (such as 200, 334) open to fluid flow from the first and second depressions (224, 332, 524), respectively, channel side walls (such as 202, 336), and a trailing channel end (such as 204, 338) closed to the fluid flow and positioned forward of a portion of the respective bearing surface.

Another aspect of the present invention relates to a disc head slider (such as 110, 300, 400, 500, 600), which includes a slider body having a leading slider edge (such as 130, 302, 502), a trailing slider edge (such as 131, 304, 504) and a longitudinal axis (such as 134) extending from the leading slider edge to the trailing slider edge. A recessed area (such as 146, 320, 322, 520, 522) is formed on the slider body and is open to the trailing slider edge (131, 304, 504). At least one elongated rail (such as 136, 138, 312, 314, 316, 514, 516, 518) extends generally parallel to the longitudinal axis (134), along the recessed area (146, 320, 322, 520, 522) and forms a bearing surface (such as 152, 154, 324). A first elongated depression (such as 224, 332, 524) extends along the rail and has a depression floor (such as 236) which is recessed relative to the bearing surface (152, 154, 324) by a first depth. A convergent channel (such as 190, 192, 330, 528) is recessed within the bearing surface (152, 154, 324) and has a leading channel end (such as 200, 334) open to fluid flow from the first elongated depression, channel side walls (such as 202, 336), a trailing channel end (such as 204, 338) closed to the fluid flow and forward of a portion of the bearing surface, and a channel floor (such as 206, 340) which is recessed relative to the bearing surface by a second depth that is less than the first depth.

Yet another aspect of the present invention relates to a disc drive (such as 100), which includes a disc (such as 107) and a slider bearing (such as 110, 300, 400, 500, 600). The disc (107) is rotatable about a central axis (such as 109) and has a recording surface. The slider bearing (110, 300, 400, 500, 600) supports a transducer (such as 164) over the recording surface while for directing air flow along rails (such as 136, 138, 312, 314, 316, 514, 516, 518) of the slider bearing means and over a convergent channel feature (such as 190, 192, 330, 528) formed in the rails.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the present invention can be used on sliders having various bearing geometries, such as negative pressure air bearing (NPAB) sliders and positive pressure air bearing (PPAB) sliders, without departing from the scope and spirit of the present invention. Also, the slider of the present invention can be used with various types of transducers, such as magnetic heads, magneto-resistive heads, and optical heads. Other modifications can also be made.

What is claimed is:

1. A disc head slider comprising:
    a longitudinal axis;
    a recessed region;
    first and second elongated rails extending generally parallel to the longitudinal axis and being disposed about the recessed region, with each tail forming a respective bearing surface;
    first and second elongated depressions extending along the first and second rails, respectively, and each having a depression floor which is recessed relative to the respective bearing surface; and
    first and second convergent channels, which are recessed within the first and second rails, respectively, relative to the respective bearing surfaces, and comprise a leading channel end open to fluid flow from the first and second depressions, respectively, channel side walls and a trailing channel end closed to the fluid flow and forward of a portion of the respective bearing surface.

2. The disc head slider of claim 1 wherein the first and second elongated depressions are each surrounded by a less recessed surface of the respective rail.

3. The disc head slider of claim 2 wherein the first and second rails each comprise:

an inside barrier surface which extends along at least a portion of the respective rail and separates the respective depression from the recessed region; and an outside barrier surface which extends along at least a portion of the respective rails and separates the respective depression from a side edge of the slider, wherein the inside and outside barrier surfaces are raised relative to the depression floor.

4. The disc head slider of claim 3 wherein:

the bearing surfaces of the first and second tails each include a leading bearing surface and a trailing bearing surface;

the first and second convergent channels are recessed within the trailing bearing surfaces of the first and second rails, respectively; and the inside and outside barrier surfaces of each rail extend from the leading bearing surface to the trailing bearing surface, are recessed relative to the leading and trailing bearing surfaces and are raised relative to the first and second depressions.

5. The disc head slider of claim 3 wherein:

the inside and outside barrier surfaces have lengths measured in a direction parallel to the longitudinal axis; and the inside barrier surface has a different depth than the outside barrier surface, as measured from the bearing surface of the respective rail, along at least a portion of the length.

6. The disc head slider of claim 5 wherein:

the inside barrier surface is recessed along the length for a first distance measured from a leading end of the respective depression toward a trailing end of the respective depression; and the outside barrier surface is recessed along the length for a second distance measured from the leading end of the respective depression toward the trailing end of the respective depression and wherein the second distance is different from the first distance.

7. The disc head slider of claim 1 wherein the first and second depressions intersect the leading channel ends of the first and second convergent channels, respectively.

8. The disc head slider of claim 1 wherein the portion of the respective bearing surface that is rearward of the trailing channel end is out-of-plane with respect to other portions of the respective bearing surface.

9. The disc head slider of claim 1 and further comprising:

a third elongated rail extending generally parallel to the longitudinal axis, between the first and second elongated rails, and separating the recessed region into a first recessed region that is positioned between the first and third elongated rails and a second recessed region that is positioned between the second and third elongated rails, wherein the third elongated rail forms a respective bearing surface;

a third elongated depression which is recessed within the third elongated rail, relative to the respective bearing surface of the third rail; and a third convergent channel, which is recessed within the third rail relative to the respective bearing surface and comprises a leading channel end open to fluid flow from the third depression, channel side walls and a trailing channel end closed to the fluid flow from the third depression and forward of a portion of the respective bearing surface of the third rail.

10. The disc head slider of claim 9 and further comprising:

a cavity dam extending parallel to a leading edge of the slider, forward of the first and second recesses;

a fourth elongated depression which is recessed within the cavity dam and extends generally perpendicular to the longitudinal axis, wherein the fourth depression is connected to a leading end of at least one of the first, second and third depressions.

11. The disc head slider of claim 1 wherein the channel side walls diverge from one another as the channel side walls extend toward the trailing channel end.

12. A disc head slider comprising:

a slider body having a leading slider edge, a trailing slider edge and a longitudinal axis extending from the leading slider edge to the trailing slider edge;

a recessed area which is open to the trailing slider edge;

at least one elongated rail extending generally parallel to the longitudinal axis, along the recessed area and forming a bearing surface;

a first elongated depression extending along the rail and having a depression floor which is recessed relative to the bearing surface by a first depth; and a convergent channel recessed within the bearing surface and comprising a leading channel end open to fluid flow from the first elongated depression, channel side walls, a trailing channel end closed to the fluid flow and forward of a portion of the bearing surface, and a channel floor which is recessed relative to the bearing surface by a second depth that is less than the first depth.

13. The disc head slider of claim 12 wherein the first elongated depression is surrounded by a less recessed surface of the rail.

14. The disc head slider of claim 13 wherein the elongated rail comprises:

an inside barrier surface which extends along at least a portion of the rail and separates the first depression from the recessed area; and an outside barrier surface which extends along at least a portion of the rail and separates the first depression from a side edge of the slider, wherein the inside and outside barrier surfaces are raised relative to the depression floor.

15. The disc head slider of claim 14 wherein:

the inside and outside barrier surfaces have lengths measured in a direction parallel to the longitudinal axis;

the inside barrier surface has a different depth than the outside barrier surface, as measured from the bearing surface, along at least a portion of the length.

16. The disc head slider of claim 15 wherein:

the inside barrier surface is recessed along the length for a first distance measured from a leading end of the first depression toward a trailing end of the first depression; and the outside barrier surface is recessed along the length for a second distance measured from the leading end of the first depression toward the trailing end of the first depression and wherein the second distance is different from the first distance.

17. The disc head slider of claim 14 wherein:

the bearing surface includes a leading bearing surface and a trailing bearing surface;

the convergent channel is recessed within the trailing bearing surface; and the inside and outside barrier surfaces extend from the leading bearing surface to the trailing bearing surface, are recessed relative to the leading and trailing bearing surfaces and are raised relative to the depression floor.

18. The disc head slider of claim 12 wherein the portion of the bearing surface that is rearward of the trailing channel end is out-of-plane with respect to other portions of the bearing surface.

19. The disc head slider of claim 12 and further comprising:
- a cavity dam extending parallel to the leading slider edge, forward of the recessed area, wherein the rail extends rearward of the cavity dam, toward the trailing slider edge; and
- a second elongated depression which is recessed within the cavity dam and extends generally perpendicular to the longitudinal axis, wherein the second depression is connected to a leading end of the first depression.

20. A disc drive assembly comprising:
- a disc rotatable about a central axis and having a recording surface; and
- slider bearing means for supporting a transducer over the recording surface and for directing air flow along rails of the slider bearing means and over a convergent channel feature formed in the rails.

* * * * *

UNITED STATES PATENT AND TRADEMARK OFFICE
CERTIFICATE OF CORRECTION

PATENT NO.          : 6,678,119 B1                                       Page 1 of 1
APPLICATION NO.    : 09/832050
DATED               : January 13, 2004
INVENTOR(S)        : John R. Pendray and Yu-Li Chang It is certified that error appears in the above-identified patent and that said Letters Patent is hereby corrected as shown below:

Col. 10, line 50, change "tail" to --rail--.
Col. 11, line 10, change "tails" to --rails--.

Signed and Sealed this

Thirteenth Day of October, 2009

David J. Kappos
*Director of the United States Patent and Trademark Office*